J.W. MIDDLETON.
Air-Compression and Expansion Engines.
No. 155,328. Patented Sept. 22, 1874.
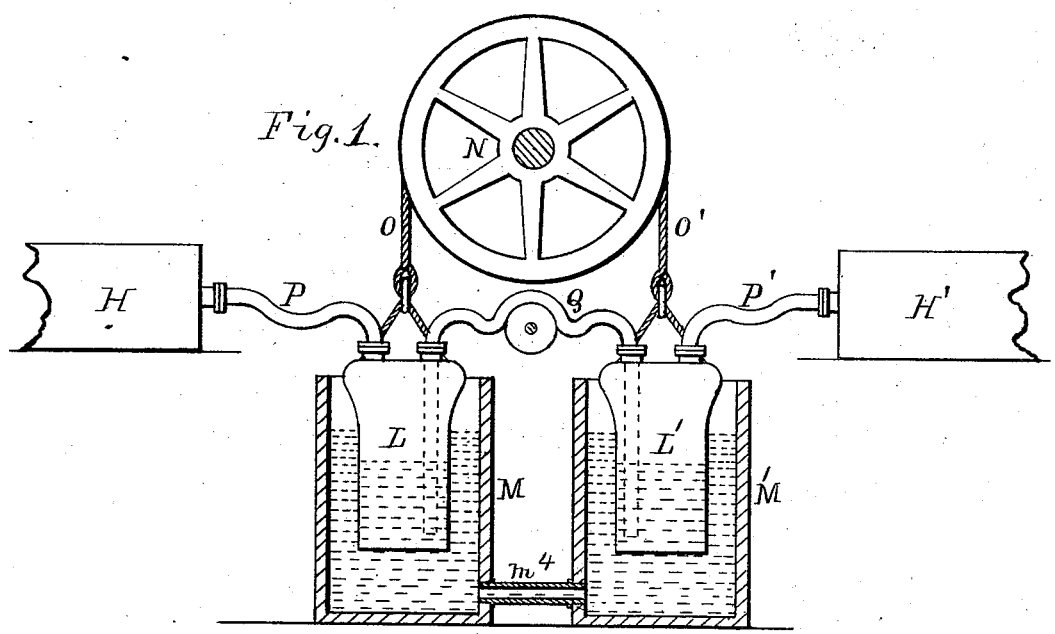
Witnesses:
Benj Morison
Wm H. Morison
Inventor:
John W. Middleton

UNITED STATES PATENT OFFICE.

JOHN W. MIDDLETON, OF PHILADELPHIA, PENNSYLVANIA.

IMPROVEMENT IN AIR COMPRESSION AND EXPANSION ENGINES.

Specification forming part of Letters Patent No. 155,328, dated September 22, 1874; application filed June 15, 1874.

*To all whom it may concern:*

Be it known that I, JOHN W. MIDDLETON, of the city of Philadelphia, in the State of Pennsylvania, have invented an Air Contraction and Expansion Engine, of which the following is a specification:

The object of my invention is to render the waste steam heat or the waste heat of the gas-flue of a furnace or stack, or even the heat from the direct rays of the sun, as well as the higher heat of a special furnace, available for producing great motive power at small cost. I effect this by means of devices whereby variations in the temperature of confined air, gas, or vaporable fluids are caused to change the position of water or other ponderable liquid in a containing vessel or vessels without any loss of heat in the said air, gas, or vaporable fluid used, except what may be lost by radiation, and thus put in motion the vessel or vessels containing the ponderable liquid, and develop a practical motor in the gravitating movements of the said vessel or vessels without the loss of any heat except that which may radiate from the vessel or vessels.

Referring to the drawings, Figure 1 represents an apparatus combining the vessels for expanding and contracting the aeriform fluids with the vessels for containing and varying the position of the ponderable liquid, and thereby giving motion to the vessel containing it, the said apparatus being more especially intended for high pressure.

Referring to Fig. 1, H H are two like expanding vessels, made to be in communication, respectively, with two gravity-vessels, L L', supported upon water in two communicating tanks, M M', the two gravity-vessels, when the apparatus is not in operation, being each nearly half filled with water or other suitable ponderable liquid, and kept in the upright positions required by means of a correspondingly large pulley, N, and a wire rope, O, or chain of sufficient length, and the wheel N supported upon its shaft at a sufficient height to allow the vessels L L' alternately to rise to the top of their respective tanks, which are about half filled with water; and being in communication with each other by the pipe $m^4$ near their respective bottoms, the upper surfaces of said water will remain in the same horizontal plane during the movements of the vessels L L', and at the same time serve as a cushion or yielding medium for receiving the respective vessels L L' in their descent, the vertical movements of the said vessels giving vibratory motions to pulley N and its shaft, thus producing the motive power, which may be readily transmitted by a band or gear wheels, as may be desired. A flexible tube, of sufficient length, Q, to allow the required motions of the vessels L L', is supported at its mid-length by a small pulley, enters the respective vessels L L' in an air-tight manner, and extends down near to the bottom of each, and each of the said vessels L L' is connected with its respective vessel H by a flexible pipe, P, of sufficient length to allow the requisite vertical motions of the gravity-vessels L L', and allow the air or gas to pass backward and forward.

The operation of this apparatus, Fig. 1, is as follows, viz: The two apparatus H H being in connection, respectively, with two hot-air flues leading into a suitable furnace, and provided with suitable valves, whereby the heat can be alternately applied to the air or gas vessels—which, being well understood, need not be described—it will be readily understood that as the air or gas in one vessel H is expanded by the said heat, it will force the ponderable liquid in the vessel with which it is in communication into the opposite vessel, and cause it to descend by gravitation, while the one receiving the expanded air or gas will rise, and thus turn the pulley and shaft around in one direction, the air or gas in the descending vessel being forced into the cool vessel, with which it is connected. The heat is now shut off from the first air or gas vessel and the whole admitted from the furnace to the opposite air or gas vessel, and the contained aeriform fluid expands and forces the liquid which is in the lowered gravity-vessel back into the elevated one, and, in the same manner as before described, causes the pulley N and its shaft to move around in an opposite direction, and so on a motive power is obtained from the shaft of said pulley N which can be readily transmitted and used for any purpose.

It will be seen that a motive power corresponding to the strength and capacity of the apparatus is hereby obtained by the use of a small amount of heat, and that none of it is lost except by radiation. The cooling of the vessels H H alternately may be expedited, and consequently a more rapid motion given to the gravity-vessels L L', by the use of side flues and valves for transmitting cold air to the vessels H H alternately, the said valves in all the flues being operated automatically by the motive-power apparatus.

The apparatus should have the vessels H H and the gravity-vessels L L' made of thick plate-copper or plate iron or steel, proportionate in strength to the strength of the high pressure to be applied.

I claim as my invention—

The combination of the air-tight vessels H H for containing an aeriform fluid to be expanded by heat and contracted by radiation, the vessels L L' for containing a ponderable liquid, the flexible pipe Q for conducting said ponderable liquid from one to the other of the vessels L L', and the flexible pipes P P, substantially as set forth.

JOHN W. MIDDLETON.

Witnesses:
 BENJ. MORISON,
 WM. H. MORISON.